Jan. 27, 1959  K. A. KLINGLER  2,870,638
PRESSURIZED EXTENSIBLE SEALS
Filed Aug. 6, 1956  3 Sheets-Sheet 1
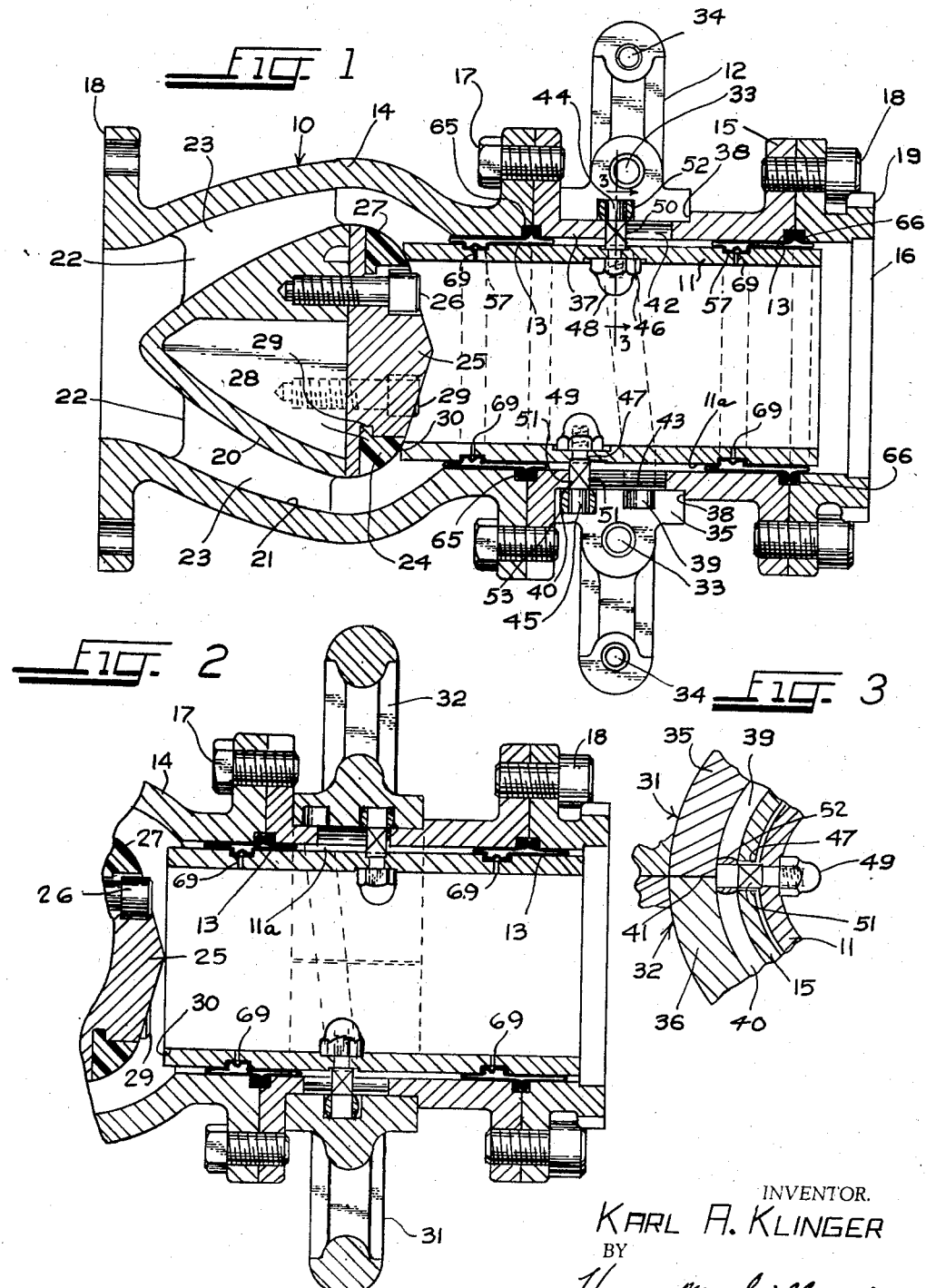
INVENTOR.
KARL A. KLINGER
BY
Harvey M. Gillespie
ATTY.

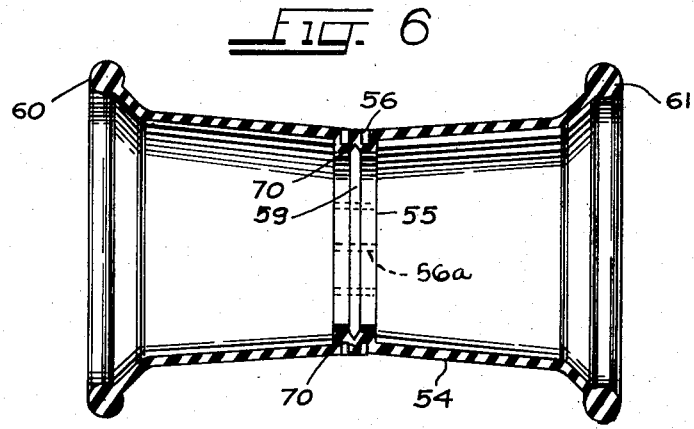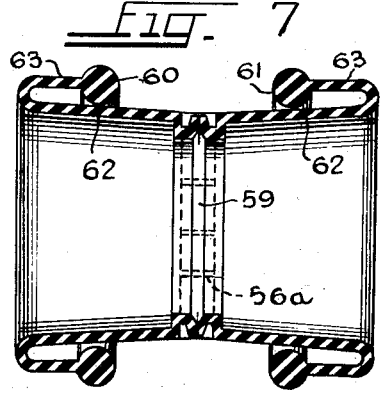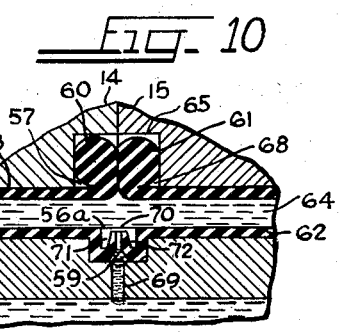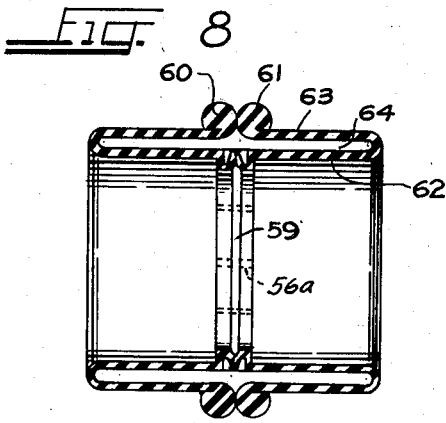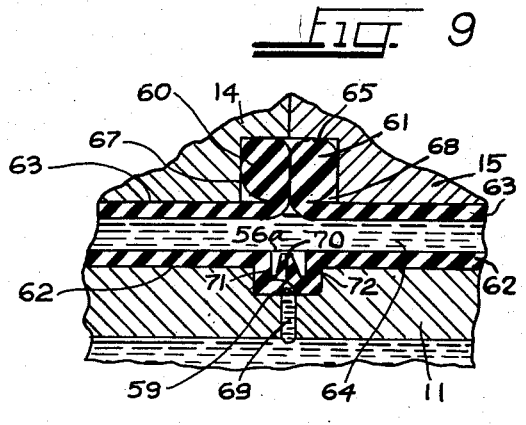

United States Patent Office 2,870,638
Patented Jan. 27, 1959

2,870,638
PRESSURIZED EXTENSIBLE SEALS
Karl A. Klingler, Naperville, Ill.
Application August 6, 1956, Serial No. 602,251
5 Claims. (Cl. 74—18.2)

The present invention relates to an improved extensible seal for providing a leak-proof seal between relatively reciprocable members, for example a reciprocating shaft or conduit and a surrounding wall of a casing associated therewith.

The principal object of the invention is to provide an extensible seal in the form of a double walled sleeve which can be readily applied in a small space between relatively reciprocable members and thereafter inflated to provide a wide pressurized contact area with the adjacent walls of both said reciprocable members and which, in addition to providing a leak-proof seal between said members, serves to maintain them in longitudinal axial alignment for all operative positions of the parts and to hold them in the spaced apart relation so as to avoid frictional contact and consequent wear of the parts.

Another object of the invention is to provide improved constructions in extensible seals of this general type, whereby the sealing member is automatically inflated by a liquid or other fluid contained under pressure in one of said relatively movable members.

A further and more specific object of the invention is to provide a sealing means for relatively reciprocable members which will automatically compensate for any misalignment of the parts and which will provide an effective seal between the parts associated therewith without requiring machining of the parts.

According to the present invention the improved seal comprises a resilient sleeve of elastomeric material formed with a medial rib portion for attachment to one of the relatively reciprocable members. The outer ends of the sleeve are formed with circular beads in the nature of O-rings and are adapted, upon reversing the end portions and drawing them rearwardly to overlap the medial portion of the sleeve, to fit snugly into abutting sealing engagement with each other within a channel formed in the other relatively reciprocable member. The reversed ends of the sleeve imparts to it a double wall construction defining an enclosed chamber adapted to receive a pressure fluid to expand the sleeve and thereby press the side walls thereof into firm sealing engagement with both of the relatively reciprocable members.

The pressure fluid for inflating the sleeve enters the pressure chamber through one or more one-way resilient valves constructed by forming a small slit or slits in the medial portion of the sleeve. The walls of the sleeve at the entrance end of such slits are V-shaped so that the pressure of fluid pressing against the V-shaped walls of the groove 59 tends to open the slits in a direction to permit fluid to enter into the pressure chamber of the sealing member. The opposite wall of the seal in the region of the valve slits is provided with resilient lips surrounding the slits whereby the internal pressure in the sleeve tends to hold the valve closed to prevent leakage of pressure therethrough.

Other objects and advantages of the invention, not at this time enumerated, will become readily apparent from the following description of one preferred embodiment of the invention.

In the drawings:

Fig. 1 is a longitudinal sectional view of a valve structure embodying my improved extensible seal;

Fig. 2 is a fragmentary longitudinal section similar to that shown in Fig. 1 but illustrating the parts thereof in different positions;

Fig. 3 is a fragmentary sectional view taken on line 3—3 of Fig. 1 looking in the direction indicated by the arrows;

Fig. 6 is an enlarged longitudinal sectional view through a sleeve element as initially constructed;

Fig. 7 illustrates the same sleeve member with its opposite ends partially turned back upon the medial portion and representing one step in the manufacture of the sleeve;

Fig. 8 shows the improved sleeve of the present invention formed in readiness for its installation in the assembly shown in Figs. 1 and 2;

Figure 4:
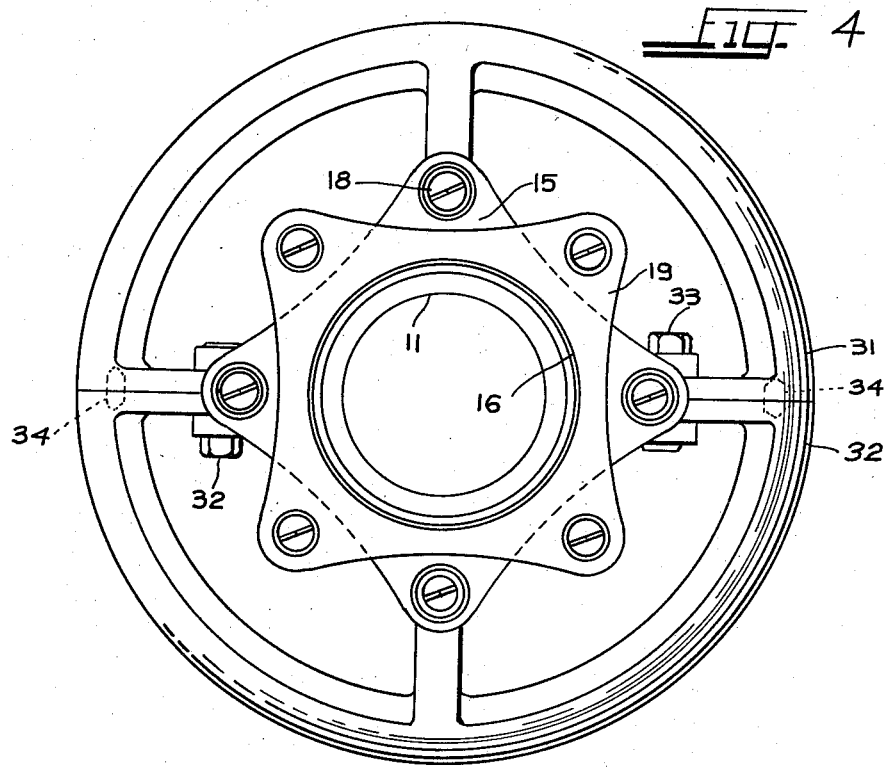
Fig. 4 is an end view of the valve structure looking from the right of Fig. 1.
Figure 5:
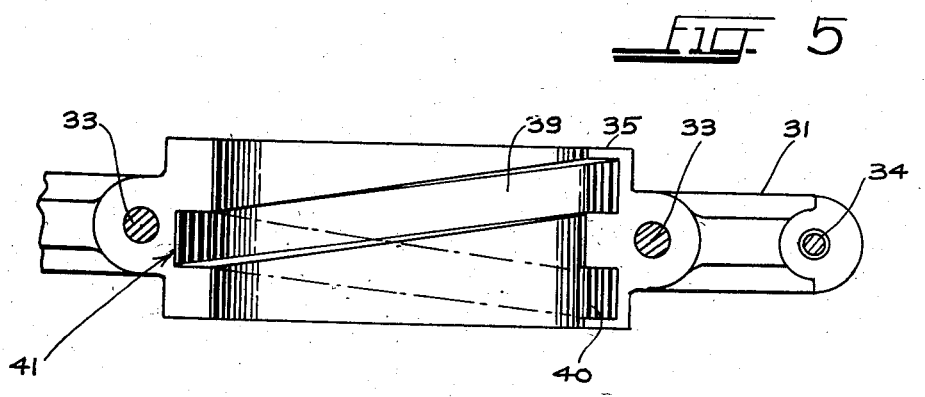
Fig. 5 is a fragmentary view, in elevation, of one-half of a sectional operating wheel shown in Figs. 1, 2 and 4.

Fig. 9 is a fragmentary view of a further enlargement of portions of the relatively reciprocable members and portions of the improved seal member located in its operative position between said reciprocable members; and Fig. 10 is a view similar to Fig. 9 but illustrating the manner in which pressure fluid is delivered into the sealing member through a pressure opened slit passageway formed in a side wall of the sealing member.

The improved extensible seal of the present invention is adaptable for use, either with or without modification, in many situations. For the purpose of illustration, it is shown herein as embodied in a valve construction for sealing the space between a reciprocating valve element and a surrounding casing.

The valve construction herein shown may be described generally as including a sectional outer casing 10, a valve member 11, reciprocable relative to the casing, a manually operable means 12 for reciprocating the valve member toward and away from a valve seat, and a seal 13 of the double walled sleeve type, interposed between the valve member 11 and an inner wall of the casing 10.

The casing comprises three sections 14, 15 and 16 arranged end to end and secured together in axial alignment by bolts 17 and 18. The end sections 14 and 16 are flanged as shown at 17 and 18 for attachment to connecting conduits or other elements not shown.

The casing section 14 is of globe configuration and is formed interiorly with a valve seat base 20. This base is formed integrally with the casing section and is of a conical configuration conforming generally to the contour of the inner wall 21 of the casing section. The said valve seat base is secured in spaced relationship to the inner wall of the casing section 14 by means of radially extending ribs 22, so as to provide passageways 23 defining the flow path of fluid around said valve seat base. A resilient valve seat 24, preferably of elastomeric material, is fitted to the marginal portion of a circular cap element 25; the cap being attached to the base portion 20 by means of stud bolts 26. The resilient seat member 24 is preferably in the form of a ring the outer surface 27 of which conforms to the general contour of the upper portion of the wall 21 of the casing section 14. It is formed with a radial flange 28 adapted to flex into snap lock engagement with the walls of a groove 29 formed in the valve seat cap 25.

The valve member 11 is a hollow cylinder formed with a chamfered end surface 30 for seating against the valve seat chamber 34. The said valve member 11 is reciprocated by actuating mechanism 12 into and out of its seating engagement with the valve seat 24. This actuating mechanism comprises a hand wheel composed of two semi-circular parts 31 and 32 which are secured together by means of stud bolts 33 and by dowels 34. The hub portions 35, 36 of the wheel sections 31, 32, when the latter is assembled, embraces a cylindrical portion 37 of the intermediate section 15 of the valve casing. The said portion 37 of the casing embraced by the hand wheel hub sections 35, 36 is reduced in thickness to provide a circular retaining shoulder 38 for holding the wheel hub in proper position.

The inner faces of the hub sections 35, 36 are formed respectively with channels 39, 40 which connect at 41 (Figs. 1 and 3) to provide a spiral cam extending entirely around the cylindrical portion 37 of the intermediate section of the valve casing. The said portion 37 of the casing is also formed with a pair of diametrically opposed guide slots 42, 43 for receiving and guiding the movements of stub shafts 44, 45. The inner ends of these shafts extend through apertures 46, 47 formed in the cylindrical valve element 11. They are threaded or otherwise suitably fixed in said apertures 46, 47 to provide leak-proof connections and are locked in position by lock nuts 48, 49. The intermediate portions 50, 51, of the stub shafts are square in cross-section and are slidably positioned in the said guide slots 42, 43. The outer ends of the stub shafts carry rolls 52, 53 which operate within the spiral groove 39, 40 formed in the hub sections 35, 36 of the hand wheel.

It will be observed that the connected spiral groove sections 39, 40 function as a spiral cam which cooperates with the rollers 52, 53 and their associated stub shafts 44, 45 to move the cylindrical valve member 11 toward and away from the valve seat 24 and thereby close and open communication between the flow passages 23 and the cylindrical passage through the valve member 11. For example, counter clockwise movement of the hand wheel moves the spiral cam grooves in a direction to move the rollers 52, 53 and consequently the valve member 11 toward the right of Fig. 1. If the hand wheel is moved in said counter clockwise direction to the limit of its movement, for example one-half revolution, the valve 11 will assume its fully open position shown in Fig. 2. Rotation of the hand wheel in a clockwise direction from its position shown in Fig. 2 moves the valve member 11 toward the valve seat 24 to restrict or entirely close the valve.

When the valve member 11 is assembled within the valve casing, there is normally a small clearance 11a between the cylindrical outer surface of the valve 11 and the cylindrical inner faces of the several sections of the valve casing 14, 15 and 16. The improved sealing members 13 of the invention are fixedly attached to the valve member 11 and to the valve casing at the junctions of the casing sections 14, 15 and 17. In some situations one sealing member may be sufficient. However in the present embodiment, the valve is operated by mechanism extending through unpacked guide slots 42, 43 and therefore requires a seal member 13 to be located beyond opposite ends of the slots to prevent leakage of fluid therethrough.

In asmuch as both seal members are of identical construction, it will be sufficient to describe the construction of one member only and identify like parts of the other member with like reference characters.

The illustrative embodiment of the improved seal of the present invention, as shown in enlarged detail in Figs. 6 to 10 inclusive, comprises a sleeve member 54 made of resilient elastomeric material. The medial portion of the sleeve member is formed with an inwardly extending rib 55 in the form of an outwardly opening channel 56. The internal diameter of the rib 55 is less than the diameter of the cylindrical valve member 11 and consequently must be expanded during its insertion over the valve member. The said valve member is provided with a pair of circular channels 57—57 for receiving the rib 55 of its associated seal member 13, 13. Located within the channel 56 is an outwardly projected rib 58 which extends entirely around the sleeve and the inner face of said rib 55 is provided with a circular V-shaped groove 59 which extends entirely around the inner face of the rib 55. This groove functions in cooperation with the inner wall of the channel 57 as a pressure chamber to be utilized, as heretofore explained, to inflate the seal member.

The opposite end portions of the sleeve from the medial portion to the ends thereof are of general bell-shape configuration and are provided with terminal beads 60, 61 which function as O-ring sealing members (see Figs. 1, 2 and 9). The sleeve is formed with its double walled construction by reversing the opposite ends of the sleeve in the manner indicated in Fig. 7 and drawing the beads 60, 61 into snug engagement with each other in the manner shown in Fig. 8. The structure thus formed provides the seal member with an inner wall 62 and an outer wall 63 which cooperate to define a pressure chamber 64. The reverse fold over of the sleeve ends may be performed either before or after the sleeve is applied over the valve member 11. During the application of the sleeve to its operative position on the cylindrical valve member 11, it is forced over the outer surface of the valve until the internal rib 55 snaps into snug engagement with the walls of the channel 57. This operation can be advantageously performed before the valve member is inserted in the intermediate section 15 of the valve casing. After both sleeve members 13—13 are applied to the valve member 11 and the valve member is inserted within the said casing section 15, the end sections 14 and 16 of the casing are clamped against opposing ends of the intermediate section 15. The opposing faces of the casing sections 14, 15 and 16 are formed with complimentary recesses which, when the sections of the valve casing are clamped together as shown best in Figs. 1, 2 and 9, provide retaining channels 65, 66 for clamping the beads 60, 61 together in sealing engagement with each other and with the opposed side walls 67, 68 of the said channels 65, 66.

After the double walled sleeve is in its operative position between the valve member 11 and the inner wall of the casing sections 14, 15 and 16 the seal member is ready to be inflated. In the embodiment shown the pressure for inflating the seal member is obtained from the pressure normally maintained within the valve member 11. This pressure, of course, will vary for different installations. However, the fact that the space 11a between the valve 11 and the inner wall of the valve casing is relatively small, high pressures can be utilized to inflate the seal member without danger of rupturing the same. The pressure is directed from the interior of the valve member 11 through one or more bores 69 of small diameter formed in the wall of the valve member 11 and communicating with the V-shaped groove 59. The rib 56 is formed with one or more small slits 70 opposed to the bores 69, which slit or slits, as the case may be, function as one-way valves to admit pressure fluid into the chamber 64. The fluid pressure contained in the groove 59 presses against the inclined walls thereof in a direction to open the slits 70 as shown in Fig. 10 so as to permit the passage of pressure fluid into the chamber 64. After the chamber 64 is filled with fluid, the fluid pressure in the said chamber 64 exerts pressure against the external faces 71, 72 of the rib 56 in a direction to hold the slits 70 closed. It will be observed therefore that the slits 70 function as one-way valves to admit pressure into the chamber 64 but prevents discharge of pressure therefrom.

The pressure utilized to inflate the seals 13, 13 may be any fluid, liquid or gaseous, contained or passing through the valve member. The inflation is accomplished automatically during the presence of pressure within the valve structure. The pressure chamber 64 with the seal member 13 is of substantially constant volumetric capacity, since it extends unobstructed from end to end of the seal member. During the reciprocating movements of the valve 11, there is a proportional shifting of each seal member 11 as a whole but the sealing area remains constant. This condition is obtained by virtue of the fact that there is a rolling or transfer of increments of the inner and outer walls 62, 63 into each other in accordance with the direction of movement of the valve member 11.

The outwardly opening channel 56 in the rib 55 is reinforced transversely by means of a series of rigidifying ribs 56a which serve to prevent undue flexing of the side walls of the channel 56.

While I have illustrated my invention in connection with one illustrative embodiment, it will be obvious to persons familiar with the art that it may be utilized in numerous situations other than the valve structure herein shown. For example it may be used in situations in which the enclosed reciprocating member is a solid rod or a flexible cable, and the travel of the reciprocating member may be greater or less than shown herein. Furthermore, in situations which do not include pressure sources within the enclosed reciprocating member for inflating the seal member, the automatic pressure actuated valves of the seal members may be located for communication with other internal or external sources of fluid pressure for the purpose of creating the desired pressure for inflating the seal member.

I claim:

1. A pressurized extensible seal comprising, in combination, an elongated tubular sleeve adapted to seal a space between inner and outer relatively reciprocable elements; said sleeve being formed of an elastomeric material and having its opposite ends folded upon itself to provide inner and outer walls defining a fluid chamber, means for clamping said reversely folded end portions together, and valve means for controlling the admission of pressure fluid into said pressure chamber comprising a normally closed slit passageway formed in a flexible side wall of the sleeve and responsive to external fluid pressure to open the slit, and flexible lips surround the discharge end of said slit passageway, whereby the internal fluid pressure in the sleeve exerts presssure against said lips to hold the slit passageway closed.

2. A pressurized extensible seal assembly as defined in claim 1 characterized in that one of said relatively reciprocable members is formed with a retaining channel, and in that the sleeve is formed with a channel shaped rib having its open side communication with said pressure chamber and having its external walls engaging the walls of said retaining channel and further characterized in that said slit passageway is formed in a portion of said channel shaped rib and the flexible lips associated with said slit passageway projects into the channel of said rib.

3. A pressurized extensible seal assembly as defined in claim 2 characterized in that the walls of the slit passageway at the fluid inlet end thereof diverge from each other, whereby fluid pressure exerted against the diverging walls opens the slit passageway for the passage of fluid therethrough.

4. A pressurized extensible seal assembly as defined in claim 1 characterized in that one of said relatively reciprocable elements is comprised of abutting sections secured together in clamping relation with said reversely folded end portions of said sleeve.

5. A pressurized extensible seal assembly as defined in claim 4 characterized in that the sectional element for clamping the reversely folded ends of the sleeve is an outer casing for the inner reciprocating element.

References Cited in the file of this patent

UNITED STATES PATENTS 2,781,051   Hawley _____ Feb. 12, 1957